Feb. 26, 1952     G. R. HOFFMASTER     2,587,472

EYEGLASSES HAVING IMPROVED TEMPLE PIVOT STRUCTURE

Filed Dec. 8, 1949

INVENTOR.
George R. Hoffmaster
BY
Donald M. Stewart
Attorney

Patented Feb. 26, 1952

2,587,472

UNITED STATES PATENT OFFICE 2,587,472

EYEGLASSES HAVING IMPROVED TEMPLE PIVOT STRUCTURE

George R. Hoffmaster, Esterly, Pa., assignor to Willson Products, Inc., Reading, Pa., a corporation of Pennsylvania Application December 8, 1949, Serial No. 131,773

3 Claims. (Cl. 88—53)

The present invention relates to ophthalmic mountings, and more particularly, to a temple pivot connection for eyeglasses, especially those of the sunglass type.

A common type of pivot connection for securing temples to the frame of eyeglasses is one wherein the ends of the temples are provided with T-shaped heads for pivotally securing them to the side ears of the lens framing, which temple ends are flattened to a shape so as to form stop surfaces for limiting the opening swing of the temples. In the manufacture of such temple pivotal connections, it is necessary that the temple ends which carry the pivots be initially of greater diameter than that of the temples so that sufficient metal is provided for the flattening process to form the stop surfaces. Thus it has been necessary to initially provide a wire of larger diameter than that of the finished temples and then flatten the pivot bearing ends thereof and finally reduce the diameter of the remainder of the wire to that desired by a wire drawing process. In many instances, an additional wire drawing process was provided to reduce portions of the temple wire sufficiently to provide them with plastic covers to bear against the sides of the head. An outstanding objection to this construction of temple pivotal connection is the number of manufacturing steps required as well as the time required therefor, which materially add to the cost of manufacture.

An object of the present invention is to provide a temple pivot connection for eyeglasses which is devoid of the above named disadvantages and which may be made without the necessity of a wire drawing process.

A more specific object of the present invention is to provide a temple pivot connection which is made entirely of wire of desired diameter which need not be either drawn or flattened during assembly.

Other objects and advantages of the present invention will be apparent from a study of the following specification taken with the accompanying drawing wherein.

Figure 1:
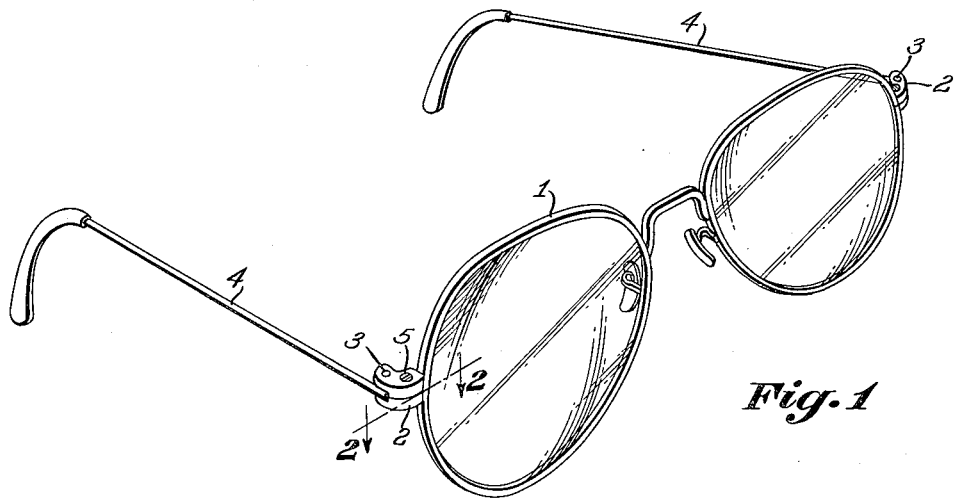
Fig. 1 is a perspective view of a pair of sunglasses embodying the features of the present invention.

Referring more particularly to the figures, numeral 1 denotes an eyeglass framing whose split rims are formed by joining together ears 2 integrally formed on and extending outwardly therefrom. Ear portion 2a is integral with the upper half and ear portion 2b integral with the lower half of the somewhat circular lens frames. Pivot pins 3 of cylindrical configuration extending vertically through corresponding apertures in the ear portions or end pieces 2a and 2b are provided for pivotally connecting the temple wires or temples 4 to the framing. The pivot pins may be of the same diameter as the temples 4 and made merely by cutting end pieces from the temple forming wire. Vertically extending screws 5 are provided for firmly securing the ear portions 2a and 2b together and for holding the pivot pins 3 in place.

An important feature of the present invention resides in the specific type of pivot connection provided at the end of the temples 4. Slightly rearwardly of the ends of the temples there are notches of arcuate shape forming seats into which may be integrally secured by a soldering or welding process the short pivot pins 3, disposed at right angles to the temples 4.

Figure 2:
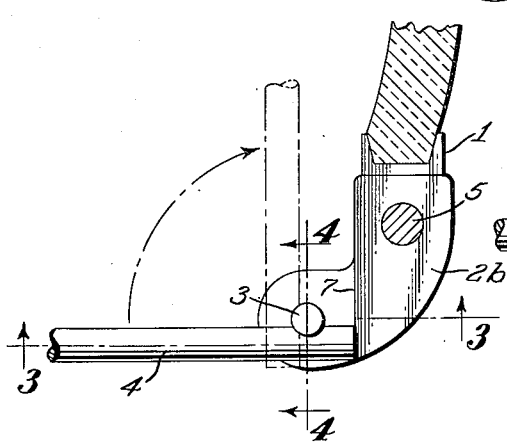
Fig. 2 is an enlarged view partly in plan and partly in cross-section of one of the temple pivotal connections taken along line 2—2 of Fig. 1.
Figure 3:
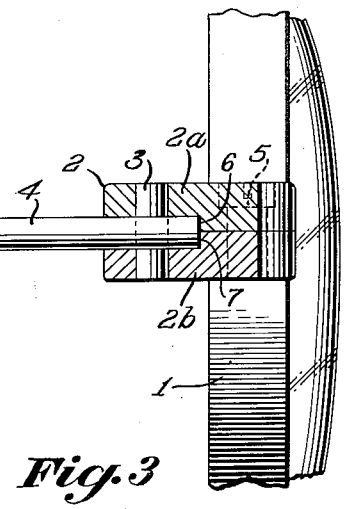
Fig. 3 is a longitudinal cross-sectional view taken along line 3—3 of Fig. 2.
Figure 4:
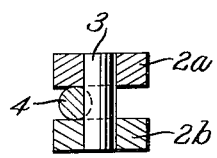
Fig. 4 is a transverse cross-sectional view taken along line 4—4 of Fig. 2.

It will be noted in Fig. 3 that the ear portions 2a and 2b of the frame are reduced in vertical thickness along their rearward surface to allow pivotal movement of the temples 4. The upper portion 2a is stepped up at 6 and the lower part 2b is stepped down at 7. The two faces 6 and 7 together form a stop wall or surface for limiting the pivotal movement or outward swing of the temples to a position substantially at right angles to the lens framing. That is, the distance between the notches and ends of the temple wire is selected so that when the temples move from the position indicated by dash-and-dot lines to the full line position of Fig. 2, the ends thereof will abut against a side wall formed by surfaces 6 and 7 and thereby limit the outward swing thereof. Thus the short extensions of the temples 4 beyond pivot 3 cooperate with the side wall surfaces 6 and 7 to provide limit stops.

It will be noted that the temple wires 4 need not be reduced in cross-section for any reason whatsoever, also, that the pivot pin 3 may be made merely by cutting off an end piece of the temple wire and then welding or soldering it to the temple wire when seated in the arcuate notch described hereinbefore. While such notch is not absolutely necessary, it has the advantage of positively positioning the pivot pin 3 with respect to the ends of the temple wires to facilitate welding at the proper distance rearward of the ends of the temples to provide the proper stop or swing-limit action.

Thus it will be seen that I have provided a relatively simple, but highly efficient temple pivot connection for eyeglasses, particularly of the sunglass type, which temple pivot connection involves a minimum of very simple parts and manufacturing operations, and at the same time provides a highly reliable pivot which is devoid of looseness and additionally will give an assured limit to the outward swing of the temples, also which connections are relatively inexpensive to manufacture on a large scale basis.

While I have illustrated and described a certain specific embodiment of my invention, it will be understood that this is by way of illustration only, and that various changes and modifications may be made within the contemplation of my invention and within the scope of the following claims.

I claim:

1. In a mounting for eyeglasses having split lens rims, each having integral ear portions extending outwardly from the ends thereof, means for securing said ear portions together, said ear portions having confronting cut-out portions to provide an intermediate space bounded by a vertically extending stop surface, a pair of temple wires, each having a short wire integrally formed short of the forward end thereof and extending at right angles to the temple in substantially tangential relationship, said short wires extending vertically through registering holes in said repective ear portions to provide pivots for the temples, said short wires being so spaced from said forward ends so that the outward swing of said temples is limited to substantially 90° by the abutment of the extreme forward end surfaces of said temples with said stop surfaces, and wherein laterally extending arcuate notches are provided near the forward ends of said temples for seating said pivotal short wires so as to definitely position said short wires at a given distance from the forward ends of the temples when integrally secured to the temples thereat, the length of each temple from the notch to the forward end thereof being substantially straight.

2. An ophthalmic mounting comprising a frame-rim provided with an outwardly projecting ear, said ear having a temple-slot bounded in part by a stop-wall of said ear, said ear having a pivot-hole spaced from said stop-wall, a temple having a wire-like substantially straight end-portion of cylindrical shape terminating in a forward end, and a wire-like cylindrical pivot-pin secured directly to said end-portion at right angles in substantially tangential relationship at a point thereof spaced from said forward end, said pivot-pin being in said pivot-hole, said pivot-pin being spaced from said forward end and said pivot-hole being spaced from said stop-wall to limit the outward swing of said temple by causing the flat end surface of said forward end to abut said stop-wall.

3. An ophthalmic mounting as defined in claim 2 but further characterized by said pivot-pin and said end-portion of said temple being the same size wire.

GEORGE R. HOFFMASTER.

REFERENCES CITED

The following references are of record in the file of this patent:

UNITED STATES PATENTS

| Number | Name | Date |
| --- | --- | --- |
| 116,222 | Risley | June 20, 1871 |
| 217,420 | Spencer | July 8, 1879 |
| 369,544 | Minster | Sept. 6, 1887 |
| 1,196,092 | Fenno | Aug. 29, 1916 |
| 2,210,507 | Spill | Aug. 6, 1940 |